United States Patent Office 3,639,346
Patented Feb. 1, 1972

3,639,346
VINYL KETONE POLYMERIZATION
Henry L. Hsieh and William R. Busler, Bartlesville, Okla.,
assignors to Phillips Petroleum Company
No Drawing. Filed July 11, 1968, Ser. No. 743,960
Int. Cl. C08g 15/00
U.S. Cl. 260—63 R
9 Claims

ABSTRACT OF THE DISCLOSURE

Vinyl ketones are polymerized in the presence of a catalyst formed by an organoaluminum compound and a metal salt of an organic acid or a beta-diketone. Water can be added to the polymerization system. In addition, the vinyl ketones can be copolymerized with alkene oxides.

---

Various processes are known in the art for polymerizing vinyl ketones. The catalyst systems employed in certain of these processes include organoaluminum compounds, alone or in combination with other materials. However, many of these prior art polymerization systems result in a fairly low conversion of monomer.

In accordance with this invention, it has been found that the conversion rate and yield of monomer can be increased substantially by the use of catalyst systems formed by organoaluminum compounds and metal salts of either organic acids or beta-diketones. Water can also be added to the polymerization system.

Accordingly, it is an object of this invention to provide improved processes for polymerizing vinyl ketones. Another object is to produce copolymers of vinyl ketones and alkene oxides.

Other objects, advantages and features of the invention should become apparent from the following detailed description.

The process of this invention is applicable to the polymerization of vinyl ketones which are represented by the formula $$R-\underset{\underset{O}{\|}}{C}-\overset{H}{\underset{}{C}}=\overset{H}{\underset{}{C}}-H$$

wherein R is a saturated aliphatic, saturated cycloaliphatic, or aromatic radical, or combinations thereof, containing from 1 to 20 carbon atoms. Examples of such vinyl ketones include methyl vinyl ketone; dodecyl vinyl ketone; eicosyl vinyl ketone; cyclohexyl vinyl ketone; phenyl vinyl ketone; benzyl vinyl ketone; ethyl vinyl ketone; octyl vinyl ketone; 4-ethylhexyl vinyl ketone; 3,4-dimethyl-6-ethyloctyl vinyl ketone; cyclobutyl vinyl ketone; cyclododecyl vinyl ketone; 4-phenylcyclohexyl vinyl ketone; 2,4-dimethylphenyl vinyl ketone; 2,3-diphenylpentyl vinyl ketone; 3-cyclopentylphenyl vinyl ketone; 3,4-diethylcyclopentyl vinyl ketone; 1-naphthyl vinyl ketone; 2-naphthyl vinyl ketone; 4-propyl-1-naphthyl vinyl ketone; 4,6-dicyclopentyl-2-naphthyl vinyl ketone; 4,6-dimethylcyclooctyl vinyl ketone; and butyl vinyl ketone.

This invention is applicable to the formation of homopolymers or copolymers of the foregoing vinyl ketones. In addition, copolymers of these ketones with one or more alkene oxides can also be produced. The alkene oxides which can be so employed are alkene oxides containing from 2 to 20 carbon atoms and which are represented by the formula

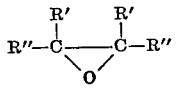

wherein each R' and R" individually is hydrogen or a saturated aliphatic, saturated cycloaliphatic, monoolefinic aliphatic, diolefinic aliphatic (conjugated or non-conjugated), monoolefinic cycloaliphatic, diolefinic cycloaliphatic (conjugated or non-conjugated), or aromatic radical or a combination of these such as aralkyl, alkaryl, and the like. Some or all of the R' and R" radicals can be halogen-substituted, and can contain oxygen in the form of an acyclic ether linkage (—O—) or an oxirane group

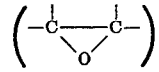

Further, the alkene oxides represented by the above formula can contain 1 or 2 olefinic linkages, 1 or 2 oxirane groups, and 1 ether linkage. In addition, both R" radicals can represent a divalent aliphatic hydrocarbon radical which, together with the carbon atoms of the oxirane group, can form a cycloaliphatic hydrocarbon nucleus containing from 4 to 10 carbon atoms.

Specific examples of some of the alkene oxides which can be employed are ethylene oxide (epoxyethane);
1,2-epoxypropane (propylene oxide);
1,2-epoxybutane;
2,3-epoxybutane;
1,2-epoxypentane;
2,3-epoxypentane;
1,2-epoxyhexane;
3,4-epoxyhexane;
1,2-epoxyheptane;
2,3-epoxyoctane;
2,3-dimethyl-2,3-epoxypentane;
1,2-epoxy-4-methylpentane;
2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;
6-oxabicyclo[3.1.0]hexane;
7-oxabicyclo[4.1.0]heptane;
3-n-propyl-7-oxabicyclo[4.1.0]heptane;
bis(2,3-epoxybutyl) ether;
tert-butyl 4,5-epoxyhexyl ether; and
2-phenylethyl 3,4-epoxybutyl ether.

Specific examples of some unsaturated alkene oxides which can be employed include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl-3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy 1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;

3,4-epoxy-1,5-hexadienyl isopropyl ether;
allyl 3,4-dimethyl-3,4-epoxyhexyl ether;
3,4-epoxy-4-(2,3-dimethylphenyl) 1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl) 1,2,6,7-diepoxyheptane; and
1-phenyl-1,2-epoxy-5,7-octadiene.

The amount of alkene oxides so employed is in the range of 0 to 95 parts by weight per 100 parts of total monomer, preferably 0–60 parts by weight alkene oxide per 100 parts of total monomer.

The catalyst employed in the process of this invention is formed by at least one organoaluminum compound and at least one metal salt of an organic acid or a beta-diketone. The orgnoaluminum compounds which can be employed are represented by the formula $$R'''_n AlH_m$$

where each $R'''$ is an aliphatic, cycloaliphatic or aromatic radical, containing from 1 to 20 carbon atoms, $n$ is an integer from 1 to 3, $m$ is an integer from 0 to 2, and $n+m$ equals 3. Examples of these compounds include trimethylaluminum,
triethylaluminum,
tri-n-propylaluminum,
triisopropylaluminum,
tri-n-butylaluminum,
triisoamylaluminum,
tri-n-hexylaluminum,
tri-n-octylaluminum,
tri-n-dodecylaluminum,
tricyclohexylaluminum,
triphenylaluminum,
tribenzylaluminum,
trieicosylaluminum,
diethyl-n-butylaluminum,
tri-4-tolylaluminum,
tri(2-hexyltetradecyl)aluminum,
methyldi(4-cyclohexyloctyl)aluminum,
ethyldi(2-butylcyclohexyl)aluminum,
tri(2,4,8-trimethylhendecyl)aluminum,
isopropylaluminum dihydride,
n-nonylaluminum dihydride,
4-methylcyclohexylaluminum dihydride,
2,4,6-triethylphenylaluminum dihydride,
3,5,7-tri-n-propylhendecylaluminum dihydride,
diethylaluminum hydride,
di(2,4,6-trimethylhexyl)aluminum hydride,
methyl(benzyl)aluminum hydride,
di-tert-butylaluminum hydride,
dieicosylaluminum hydride, and the like.

The metals employed in forming the salts of organic acid or beta-diketone are magnesium, calcium, strontium, barium, zinc and cadmium. The beta-diketone salts are represented by the formula

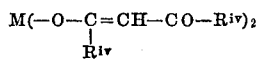

wherein M is one of the metals referred to above and each $R^{iv}$ is a saturated aliphatic, saturated cycloaliphatic, or an aromatic radical, or a combination thereof, containing from 1 to 10 carbon atoms. Examples of beta-diketones that can be used to form the metal salts are:

2,4-pentanedione (acetylacetone);
3,5-heptanedione;
1,5-dicyclopentyl-2,4-pentanedione;
11,13-tricosanedione;
1,3-dicyclohexyl-1,3-propanedione;
1,5-dicyclopentyl-2,4-pentanedione;
1,3-diphenyl-1,3-propanedione;
1,5-diphenyl-2,4-pentanedione;
2,8-dimethyl-4,6-nonanedione;
1,3-di(4-n-butylphenyl) 1,3-propanedione;
1,11-diphenyl-5,7-hendecanedione;
1-phenyl-1,3-butanedione;
2,4-decanedione; and
1-(3,5-dimethylcyclohexyl) 2,4-pentanedione.

The organic acids which can be employed in forming the metal salts are mono- and polycarboxylic aliphatic acids, mono- and poly-carboxylic cycloaliphatic acids, and mono- and poly-carboxylic aromatic acids, containing 1 to 30 carbon atoms per molecule. Examples of such acids include caprylic; cyclohexanecarboxylic; benzoic; 2-naphthoic; formic; acetic; propionic; butyric; caproic; capric; lauric; tridecanoic; stearic; palmitic; myristic; arachidic; behenic; tetracosanoic; tricontanoic; acrylic; maleic; crotonic; 3-butenoic; oleic; linoleic; linolenic; arachidonic; oxalic; malonic; succinic; sebacic; pimelic;

1,2,3-propanetricarboxylic;
1,1,5-pentanetricarboxylic;
1,2,4-hexanetricarboxylic;
5-octene-2,3,6-tricarboxylic;
cyclobutanecarboxylic;
cyclopentanecarboxylic;
4-methylcyclohexanecarboxylic;
2,6-di-n-heptyl-4-n-nonylcyclohexanecarboxylic;
2,2,6-trimethylcyclohexanecarboxylic;
cyclopentylacetic;
3-methylcyclopentylacetic;
2-cyclopentene-1-malonic;
6,7-diethyl-1-naphthalenecarboxylic;
1,4-naphthalenedicarboxylic;
1,8-naphthalenedicarboxylic;
1-anthracenecarboxylic;
3-phenanthrenecarboxylic;
1-phenanthrenebutyric;
phthalic;
terephthalic;
1,2,3-benzenetricarboxylic;
1,3,5-benzenetricarboxylic;
1,4,6-naphthalenetricarboxylic;
3-carboxycinnamic;
1-naphthaleneacrylic;
cyclooctanecarboxylic acid;
1,5-cyclooctadiene-1-carboxylic acid;
3-cyclohexane-1-carboxylic acid;
1-cyclohexene-1,2-dicarboxylic acid;
cyclotridecanecarboxylic acid;
5-propyl-8,9,12-tri-n-butylcyclotetradecanecarboxylic acid; and
cyclopentadecanecarboxylic acid.

The amount of catalyst employed, which is conveniently expressed on the basis of the organoaluminum compound in the catalyst system, is generally within the range of 1 to 100 gram millimoles per 100 grams of monomer being polymerized, with particularly good results being obtained in the range of about 5 to 40 gram millimoles of organoaluminum compound per 100 grams of monomer. In the copolymerization of two or more monomers, the amount of catalyst is based on the total amount of monomer employed. The mole ratio of organoaluminum compound to metal salt is in the range 1:1 to 50:1, with particularly good results being obtained in the range 2:1 to 10:1. Mixtures of more than one of each of the catalyst components described above can be employed.

The amount of water which can be employed as a component of the catalyst system can vary over a fairly broad range. Generally the mole ratio of organoaluminum compound to water is in the range of 1:1 to 100:1 or more. It is preferred that the mole ratio of organoaluminum compound to water be at least 1.25:1.

The polymerization reaction can be conducted either as a batch or as a continuous process with the catalyst being added as a single initial charge or in increments during the polymerization. The catalyst system can be prepared by mixing the two components and charging the resulting material to the reactor. As an alternative, the catalyst components can be charged separately. Similarly, the monomer can be introduced into the reaction zone as one charge or gradually during the polymerization. In order to improve the efficiency of the polymerization reaction, it is generally preferred that the reaction be conducted in the presence of an inert diluent. Suitable diluents which can be used for this purpose include paraffinic, cycloparaffinic, and aromatic hydrocarbons containing from 4 to 10 carbon atoms per molecule. Exemplary diluents which can be used are butane, pentane, hexane, decane, cyclopentane, cyclohexane, methylcyclohexane, benzene, toluene, xylene, ethylbenzene, and the like. Halogenated hydrocarbons of the type set forth, such as chlorobenzene, can also be employed. Mixtures of two or more diluents can be used.

The temperature and pressure at which the polymerization is effected can vary over a wide range. This temperature is generally within the range of 40 to 250° F., preferably within the range of 85 to 200° F. The pressure is generally that which will maintain the materials substantially in the liquid state.

The duration of the reaction depends primarily on temperature, pressure, and the activity of the particular catalyst used. Usually the polymerization is conducted for a period of from about 5 minutes to 100 hours or more. A preferred range is from about 10 minutes to 50 hours. Termination of the reaction, removal of catalyst, recovery of polymer, etc. can be carried out in any conventional manner.

The polymers produced according to this invention are relatively high molecular weight materials. These polymers can be used in coating compositions, as adhesives, as sizing agents for textiles, in the fabrication of molded objects, and in the preparation of various laminates. Filaments and fibers can be produced from the polymers.

The following examples serve to illustrate the improved results obtained by polymerizing vinyl ketones in accordance with this invention. It is to be understood that these examples are for the purpose of illustration only.

EXAMPLE I

Methyl vinyl ketone was polymerized by catalyst systems of this invention. The recipes were as follows:

Methyl vinyl ketone, parts by weight _____ 100
Toluene, parts by weight _____ 860
Triisobutylaluminum, mhm. _____ 25
Zinc acetylacetonate, mhm. _____ Variable Temperature, ° F. _____ 158
Time, hours _____ 20
(Mhm.=gram millimoles per 100 grams monomer.)

Toluene was charged to the reactor first. The reactor was then purged with nitrogen and methyl vinyl ketone was added, followed by the triisobutylaluminum and the zinc acetylacetonate (when use). After a 20-hour polymerization period, each reaction was shortstopped with dilute hydrochloric acid and the polymer was coagulated in n-pentane. The products were high molecular weight polymers that had a limited solubility in chloroform. Amounts of materials used and conversions were as follows:

|  | Zn(Acac)$_2$, mhm. | Conv., percent |
|---|---|---|
| Run No.: |  |  |
| 1 | 0 | 20 |
| 2 | 5 | 43 |

These data show that the addition of zinc acetylacetonate to triisobutylaluminum gave a substantial increase in conversion rate.

The product from Run 2 was extracted with acetone. The acetone-soluble portion had a melting point of 110° C. and the acetone-insoluble portion had a melting point >220° C.

EXAMPLE II

The following recipe was used:

Methyl vinyl ketone, parts by weight _____ 100
Toluene, parts by weight _____ 860
Triisobutylaluminum, mhm. _____ 20
Zinc acetylacetonate, mhm. _____ Variable
Water, mhm. _____ Variable Temperature, ° F. _____ 158
Time, hours _____ 24

The procedure was the same as described in Example I. The water was added after the triisobutylaluminum and zinc acetylacetonate (when used). Amounts of materials used and conversions were as follows:

|  | Zn(Acac)$_2$, mhm. | H$_2$O, mhm. | Conv., percent |
|---|---|---|---|
| Run No.: |  |  |  |
| 1 | 0 | 0 | 25 |
| 2 | 5 | 0 | 39 |
| 3 | 0 | 14 | 20 |
| 4 | 5 | 14 | 46 |

These results demonstrate the increased conversion obtained by the addition of zinc acetylacetonate, both with and without water being present.

EXAMPLE III

Methyl vinyl ketone was polymerized with epichlorohydrin and with propylene oxide in a series of runs. The recipes were as follows:

Toluene, parts by weight _____ 860
Methyl vinyl ketone, parts by weight _____ 50
Epichlorohydrin (ECH) parts by weight _____ 0 or 50
Propylene oxide (PO) parts by weight _____ 50 or 0
Triisobutylaluminum, mhm. _____ 25
Zinc acetylacetonate, mhm. _____ Variable
Water, mhm. _____ Variable Temperature, ° F. _____ 158
Time, hours _____ 20

The procedure was the same as described above, with both monomers being added after the nitrogen purge. The results were as follows:

|  | Zn(Acac)$_2$, mhm. | H$_2$O, mhm. | PO, phm. | ECH, phm. | Conv., percent |
|---|---|---|---|---|---|
| Run No.: |  |  |  |  |  |
| 1 | 0 | 20 |  | 50 | 14 |
| 2 | 5 | 15 |  | 50 | 21 |
| 3 | 5 | 0 |  | 50 | 26 |
| 4 | 0 | 20 | 50 |  | 16 |
| 5 | 5 | 15 | 50 |  | 20 |
| 6 | 5 | 0 | 50 |  | 23 |

While this invention has been described in conjunction with presently preferred embodiments, it should be apparent that it is not limited thereto.

What is claimed is:

1. A method for polymerizing vinyl ketones which comprises contacting under polymerization conditions at least one vinyl ketone of the formula

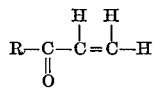

wherein R is a hydrocarbon radical selected from the group consisting of saturated aliphatic, saturated cycloaliphatic or aromatic radical, or a combination thereof, containing from 1 to 20 carbon atoms; with a catalyst consisting essentially of (a) at least one compound of the formula R'''$_n$AlH$_m$ where each R''' is a hydrocarbon radical selected from the class consisting of saturated aliphatic, saturated cycloaliphatic or aromatic radical, or a combination thereof, containing from 1 to 20 carbon atoms; $n$ is an integer from 1 to 3; $m$ is 0, 1 or 2; and the sum of $n+m$ is 3; and (b) at least one compound selected from the group consisting of (1) metal salts of mono- or polycarboxylic aliphatic hydrocarbon acids, an aliphatic hydrocarbon mono- or polycarboxylic acid, a cycloaliphatic hydrocarbon mono or polycarboxylic acid, and an aromatic hydrocarbon mono- or polycarboxylic acid said acids containing 1 to 30 carbon atoms and having 1–3 COOH groups, and the metal is magnesium, calcium, strontium, barium, zinc or cadmium or (2) compounds of the formula

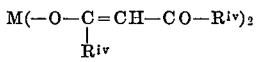

where M is a metal recited in (1) above and each $R^{iv}$ is a hydrocarbon radical selected from the class consisting of saturated aliphatic, saturated cycloaliphatic or aromatic radical, or a combination thereof, containing from 1 to 10 carbon atoms.

2. The method of claim 1 wherein said at least one vinyl ketone is copolymerized with at least one alkene oxide of the formula

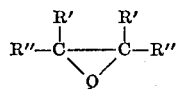

where each R' and R" is selected from the group consisting of hydrogen, a saturated aliphatic, a saturated cycloaliphatic, a monoolefinic aliphatic, a diolefinic aliphatic, a monoolefinic cycloaliphatic, a diolefinic cycloaliphatic, an aromatic radical and a halogen-substituted radical of the foregoing type, wherein said radicals can contain oxygen in the form of an acyclic ether linkage (—O—) or an oxirane group

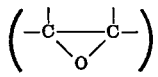

and said alkene oxide can contain 1 or 2 olefinic linkages, 1 or 2 oxirane groups, or 1 ether linkage, and both of the R' radicals in said alkene oxide can represent a divalent aliphatic hydrocarbon radical which together with the oxirane group in said alkene oxide can form a cycloaliphatic nucleus, said alkene oxide comprising up to 95 weight percent of the total monomer being polymerized.

3. The method of claim 2 wherein said alkene oxide comprises up to 60 weight percent of the total monomer being polymerized.

4. The method of claim 1 wherein the polymerization is conducted in the presence of a diluent comprising at least one compound containing from 4 to 10 carbon atoms selected from the group consisting of a paraffinic, a halogenated paraffinic, a cycloparaffinic, a halogenated cycloparaffinic, an aromatic, and a halogenated aromatic hydrocarbon.

5. The method of claim 1 wherein the polymerization is conducted at 40 to 250° F., the catalyst contains 1 to 100 gram millimoles of compound (a) per 100 grams of monomer, and the mole ratio of compound (a) to compound (b) is in the range 1:1 to 50:1.

6. The method of claim 1 wherein there is also present water in the reaction mixture, the mole ratio of compound (a) to water being in the range of 1:1 to 100:1.

7. The method of claim 5 wherein compound (a) is triisobutylaluminum and compound (b) is zinc acetylacetonate.

8. The method of claim 5 wherein the vinyl ketone is methyl vinyl ketone.

9. The method of claim 2 wherein the vinyl ketone is methyl vinyl ketone and the alkene oxide is epichlorohydrin.

References Cited
UNITED STATES PATENTS

| 3,272,786 | 9/1966 | Perry | 260—88.7 |
|---|---|---|---|
| 3,379,660 | 4/1968 | Hsieh | 260—2 |
| 3,468,860 | 9/1969 | Hsieh | 260—88.3 |

WILLIAM H. SHORT, Primary Examiner

L. L. LEE, Assistant Examiner

U.S. Cl. X.R.

260—2 E P, 2 B P, 63 K

UNITED STATES PATENT OFFICE
CERTIFICATE OF CORRECTION

Patent No. 3,639,346                                Dated: February 1, 1972

Henry L. Hsieh et al

It is certified that error appears in the above-identified patent and that said Letters Patent are hereby corrected as shown below:

Column 7, line 2, delete "mono- or polycarboxylic aliphatic hydrocarbon acids,"; column 7, line 4, after "mono" insert a hyphen; and column 7, line 6, after "acid" insert a comma.

Signed and sealed this 20th day of June 1972.

(SEAL)
Attest:

EDWARD M. FLETCHER, JR.                        ROBERT GOTTSCHALK
Attesting Officer                                    Commissioner of Patents